(12) United States Patent
Denli et al.

(10) Patent No.: US 10,054,714 B2
(45) Date of Patent: Aug. 21, 2018

(54) FAST VISCOACOUSTIC AND VISCOELASTIC FULL WAVEFIELD INVERSION

(71) Applicants: Huseyin Denli, Summit, NJ (US); Alex Kanevsky, Milburn, NJ (US)

(72) Inventors: Huseyin Denli, Summit, NJ (US); Alex Kanevsky, Milburn, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 448 days.

(21) Appl. No.: 14/693,464

(22) Filed: Apr. 22, 2015

(65) Prior Publication Data

US 2015/0362622 A1 Dec. 17, 2015

Related U.S. Application Data

(60) Provisional application No. 62/013,455, filed on Jun. 17, 2014.

(51) Int. Cl.
*G01V 99/00* (2009.01)
*G01V 1/28* (2006.01)

(52) U.S. Cl.
CPC ............ *G01V 99/005* (2013.01); *G01V 1/282* (2013.01); *G01V 2210/614* (2013.01);
(Continued)

(58) Field of Classification Search
CPC .. G01V 99/005; G01V 1/282; G01V 2210/62; G01V 2210/675; G01V 2210/614; G01V 2210/6161

See application file for complete search history.

(56) References Cited

U.S. PATENT DOCUMENTS 3,812,457 A    5/1974   Weller
3,864,667 A    2/1975   Bahjat
(Continued)

FOREIGN PATENT DOCUMENTS

WO    WO 1996-007935     3/1996   ............... G01V 1/28

OTHER PUBLICATIONS

Bai, J. et al. "Viscoacoustic Waveform Inversion of Velocity Structures in the Time Domain,"XP-001589829, Geophysics 79(1), pp. R103-R0119 (May 2014).*

(Continued)

*Primary Examiner* — Omar F Fernandez Rivas
*Assistant Examiner* — Joshua E Jensen
(74) *Attorney, Agent, or Firm* — ExxonMobil Upstream Research Company Law Department

(57) ABSTRACT

A method, including: obtaining an initial geophysical model; modeling a forward wavefield with viscoacoustic or viscoelastic wave equations; modeling an adjoint wavefield with adjoint viscoacoustic or adjoint viscoelastic wave equations, wherein the adjoint viscoacoustic wave equations are based on an auxiliary variable that is a function of pressure and a memory variable or the adjoint viscoelastic wave equations are based on a combination of stress and a memory variable, respectively; obtaining a gradient of a cost function based on a combination of a model of the forward wavefield and a model of the adjoint wavefield; and using the gradient of the cost function to update the initial geophysical model and obtain an updated geophysical model.

14 Claims, 9 Drawing Sheets

(52) U.S. Cl.
CPC .. *G01V 2210/6161* (2013.01); *G01V 2210/62* (2013.01); *G01V 2210/675* (2013.01)

(56) References Cited

U.S. PATENT DOCUMENTS

| | | | |
|---|---|---|---|
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 8,890,413 B2 | 11/2014 | Routh et al. ............... 703/10 |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |

(56) References Cited

U.S. PATENT DOCUMENTS

| | | |
|---|---|---|
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0176386 A1* | 7/2011 | Lapilli .................. G01V 1/282 367/73 |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0107665 A1* | 5/2013 | Fletcher .................. G01V 1/36 367/43 |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

OTHER PUBLICATIONS

R. Brossier, Two-dimensional frequency-domain visco-elastic full waveform inversion: Parallel algorithms, optimization and performance, Computers & Geosciences, vol. 37, Issue 4, 2011, pp. 444-455, ISSN 0098-3004, http://dx.doi.org/10.1016/j.cageo.2010.09.013.*

Bai et al. ("Viscoacoustic Waveform Inversion of Velocity Structures in the Time Donnain,"XP-001589829, Geophysics 79(1), pp. R103-R0119 (May 2014)) (Year: 2017).*

Brassier (Two-dimensional frequency-domain visco-elastic full waveform inversion: Parallel algorithms, optimization and V performance, Computers & Geosciences, vol. 37, Issue 4, 2011, pp. 444-455, ISSN 0098-3004) (Year: 2011).*

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transfoim," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.

Barr, F.J. et al. (1989), "Attenuation of Water-Column Reverberations Using Pressure and Velocity Detectors in a Water-Bottom Cable," 59th Annual SEG meeting, *Expanded Abstracts*, pp. 653-656.

Baumstein, a. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transfaim," *J. Math. Phys.* 26, pp. 99-108.

(56) References Cited

OTHER PUBLICATIONS

Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full wavefoiin inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource wavefolln inversion to marine-streamer acquisition based on the global correlation," 73$^{rd}$ EAGE Conference, *Abstract*, pp. F026.
Choi, Y et al. (2012), "Application of multi-source wavefoini inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Noimal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105- 116.
Ernst, F.E. et al. (2002), "Removal of scattered guided waves from seismic data," *Geophysics* 67(4), pp. 1240-1248.
Esmersoy, C. (1990), "Inversion of P and Sv waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75$^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transfolins," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70$^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70$^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.

(56) References Cited

OTHER PUBLICATIONS

Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whitey & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-wavefield inversion: a dimenstionality-reduction approach," $80^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Mora, P. (1987), "Elastic Wavefield Inversion," PhD Thesis, Stanford University, pp. 22-25.
Mora, P. (1989), "Inversion=migration–tomography," *Geophysics* 64, pp. 888-901.
Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. and Exh., EAGE, 5 pgs.
Neelamani, R. (2009), "Efficient seismic forward modeling using simultaneous sources and sparsity," *SEG Expanded Abstracts*, pp. 2107-2111.
Nocedal, J. et al. (2006), "*Numerical Optimization, Chapt. 7—Large-Scale Unconstrained Optimization*," Springer, New York, $2^{nd}$ Edition, pp. 165-176.
Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & $72^{nd}$ Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor. Progress in Optics XXVII, Elsevier, pp. 317-397.
Pratt, R.G. et al. (1998), "Gauss-Newton and full Newton methods in frequency-space seismic waveform inversion," *Geophys. J Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), "Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multi-component OBC seismic data," Geophysical Prospecting 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," $73^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-P.SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-205.
Tang, Y. (2009), "Target-oriented wave-equation least-squares migration/inversion with phase-encoded Hessian," *Geophysics* 74, pp. WCA95-WCA107.

(56) References Cited

OTHER PUBLICATIONS

Tang, Y. et al. (2010), "Preconditioning full waveform inversion with phase-encoded Hessian," *SEG Expanded Abstracts* 29, pp. 1034-1037.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geophyhsics* 74(3), pp. A23-A28.

van Manen, D.J. (2005), "Making wave by time reversal," SEG International Exposition and 75th Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," *Geophysics* 72(2), pp. V33-V39.

Wang, K. et al. (2009), "Simultaneous full-wavefoim inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain infoimation from migrated wavefield," *SEG Expanded Abstracts* 21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

Bai, J. et al., "Viscoacoustic Waveform Inversion of Velocity Structures in the Time Domain," XP-001589829, Geophysics 79(1), pp. R103-R0119 (May-Jun. 2014).

Wang, C. et al., "Waveform Inversion Including Well Constraints, Anisotropy, and Attenuation," *The Leading Edge*, pp. 1056-1062 (Sep. 2013)

U.S. Appl. No. 14/329,431, filed Jul. 11, 2014, Krohn et al.

U.S. Appl. No. 14/330,767, filed Jul. 14, 2014, Tang et al.

Bai, Jianyong et at (2013) "Attenuation Compensation in Viscoacoustic Reserve-Time Migration," *SEG Houston—2013 Annual Mtg.*, pp. 3825-3830.

* cited by examiner

FAST VISCOACOUSTIC AND VISCOELASTIC FULL WAVEFIELD INVERSION

CROSS-REFERENCE TO RELATED APPLICATION

This application claims the benefit of U.S. Provisional Patent Application 62/013,455, filed Jun. 17, 2014, entitled FAST VISCOACOUSTIC AND VISCOELASTIC FULL-WAVEFIELD INVERSION, the entirety of which is incorporated by reference herein.

TECHNOLOGICAL FIELD

Exemplary embodiments described herein pertain to geophysical prospecting and, more particularly, to seismic data processing that includes recovering viscoacoustic and/or viscoelastic parameters from seismic data using the full-wavefield inversion (FWI) technique, and that also includes imaging subsurface interfaces using reverse time migration (RTM).

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.
Viscoacoustic and Viscoelastic Wavefield Modeling In the time-domain, intrinsic attenuation (absorption and dispersion) is formulated with convolution operators between strain and relaxation functions. Such convolutions are computationally impractical for large-scale wave propagation simulations using time-marching methods. Incorporation of realistic attenuation into time-domain computations was first achieved using Padé approximants by Day and Minster (Day and Minster, 1984). Later, Padé approximants evolved into sophisticated viscoacoustic and viscoelastic rheological models in rational forms, such as the generalized-Maxwell (GMB) and Standard-Linear-Solid (SLS) models. Attenuation modeling methods in the time domain are based on either the GMB or SLS formulations given by Emmerich and Korn (1987) and Carcione et al. (1988), respectively, and use rheological models based on relaxation mechanisms.

A relaxation mechanism is the unit of the time-domain attenuation model representing viscous effects in a narrow frequency band. Multiple relaxation mechanisms are combined to model attenuation over a desired frequency band, introducing additional state variables and partial differential equations (PDE) to the acoustic and elastic forward wave equations. A considerable amount of computational time and memory are consumed by these additional variables and equations during forward wave simulations and to an even greater degree during adjoint simulations.

Only simplified versions of approximate SLS formulations have been incorporated into FWI to infer a frequency-invariant attenuation at a reduced computational cost, such as Robertsson et al. 1994, Charara et al. 2000, Hestholm et al. 2006, and Royle 2011. Not only does the accuracy of such approximations deteriorate with decreasing quality factor values (stronger attenuation), but also they cannot be used to model quality factors that vary with frequency.

Another approach is to limit the number of relaxation mechanisms to one or two in order to minimize the complexity of the SLS model, which results in poor representation of the targeted quality factor over the seismic frequency band of interest. For example, Charara (Charara 2006) suggests using only two relaxation mechanisms for the SLS model to reduce the computational cost in computing gradients. Their formulation requires computing spatial derivatives of memory variables in the adjoint simulations, which limits them in the total number of relaxation mechanisms that can be used in their approximate SLS model. Also, Bai (Bai et al., 2012) presented a method for compensating attenuation effects for FWI using a single mechanism SLS model with the assumption of a frequency-invariant quality factor.

While only SLS attenuation models have been incorporated into time-domain viscoacoustic and viscoelastic FWI techniques, both SLS and GMB models have been used for forward viscoacoustic and viscoelastic modeling of waves. For example, Käser (Käser et al., 2007) applied GMB for modeling viscoelastic waves with a discontinuous Galerkin method.

A common measure of attenuation is the quality factor, a dimensionless quantity that defines the frequency dependence of the acoustic or elastic moduli. The quality factor itself can be frequency dependent, especially for fluid-bearing rocks such as hydrocarbons, and is typically assumed to be frequency invariant for dry rocks (Muller et al., 2010; Quintal, 2012). Therefore, it is useful to infer the frequency dependence of the quality factor to identify fluid bearing rocks such as reservoirs.

The SLS attenuation model represents the numerical inverse of the quality factor Q, also called the loss factor, by the following relation (Carcione et al., 1988):

$$Q^{-1}(x, \omega) = \frac{\sum_{l=1}^{L} \frac{\omega(\tau_{\varepsilon l}(x) - \tau_{\sigma l}(x))}{1 + \omega^2 (\tau_{\sigma l}(x))^2}}{\sum_{l=1}^{L} \frac{1 + \omega^2 \tau_{\varepsilon l}(x) \tau_{\sigma l}(x)}{1 + \omega^2 (\tau_{\sigma l}(x))^2}} \quad (1)$$

where
Q=quality factor,
$\tau_{\varepsilon l}$=strain relaxation time of mechanism l in SLS model,
$\tau_{\sigma l}$=stress relaxation time of mechanism l in SLS model,
x=spatial coordinate,
$\omega$=frequency,
L=number of relaxation mechanisms used in the SLS model.
Conceptually, the quality factor Q represents the ratio of stored to dissipated energy in a medium. The strain and stress relaxation times are determined to best fit the desired quality factor distribution over the frequency band.

A conventional first-order form of the linear viscoacoustic wave equations for simulating waves in attenuating acoustic media (JafarGandomi et al. 2007) is:

$$\frac{\partial p}{\partial t} + \kappa \nabla \cdot v + \sum_{l=1}^{L} \phi_l m_l = s_p, \quad (2)$$

$$\frac{\partial v}{\partial t} + \frac{1}{\rho}\nabla p = s_v,$$

$$\frac{\partial m_l}{\partial t} + \kappa\alpha_l\nabla\cdot v + \phi_l m_l = 0,\qquad(2)$$

with appropriate initial and boundary conditions for pressure p, velocity v, and memory variables $m_l$. Note that
∇=divergence operator,
κ=unrelaxed bulk modulus ($\lim_{\omega\to\infty}\kappa(\omega)\to\kappa$),
ρ=mass density,
v=velocity (v=$\{v_x\ v_y\ v_z\}^T$ in 3D space),
p=pressure,
$m_l$=memory variable for mechanism l,
$s_p$=pressure source,
$s_v$=velocity source, $$\phi_l = \frac{1}{\tau_{\sigma l}}\text{ and }\alpha_l = \left(1 - \frac{\tau_{\sigma l}}{\tau_{\epsilon l}}\right)$$

where relaxation parameters $\tau_{\epsilon l}$ and $\tau_{\sigma l}$ may be determined by Equation (1) for a given quality factor profile. Note that continuous scalar variables are denoted by italicized characters and vector and matrices are denoted by bold non-italicized characters throughout this document.

FWI methods based on computing gradients of an objective function with respect to the parameters are often efficiently implemented by using adjoint methods, which have been proved to outperform other relevant methods, such as direct sensitivity analyses, finite differences or complex variable methods. One can find a detailed discussion about adjoint methods in Thevenin et al., 2008.

The continuous adjoint of the conventional viscoacoustic system (Equations (2)) is $$\frac{\partial \bar{p}}{\partial t} + \nabla\cdot\left(\frac{1}{\rho}\bar{v}\right) = \frac{\partial \mathcal{F}}{\partial p},\qquad(3)$$

$$\frac{\partial \bar{v}}{\partial t} + \nabla(\kappa\bar{p}) + \sum_{l=1}^{L}\nabla(\kappa\alpha_l\bar{m}_l) = \frac{\partial \mathcal{F}}{\partial v},$$

$$\frac{\partial \bar{m}_l}{\partial t} + \phi_l\bar{p} + \phi_l\bar{m}_l = 0,$$

where
$\bar{p}$=adjoint pressure,
$\bar{v}$=adjoint velocity,
$\bar{m}_l$=adjoint memory variable for mechanism l, and
$\partial\mathcal{F}/\partial p$ and $\partial\mathcal{F}/\partial v$ are derivatives of the objective function $\mathcal{F}$ with respect to the pressure and velocity respectively. Although the objective function and its derivative with respect to the pressure and velocity will be explicitly defined in the Viscoacoustic and Viscoelastic Full Wavefield Inversion Section, $\partial\mathcal{F}/\partial p$ and $\partial\mathcal{F}/\partial v$ can simply be considered as sources to the adjoint equations.

Note that the derivation of the adjoint equations involves using integration by parts, which introduces both spatial and temporal boundary terms into the adjoint equations (which are evaluated at the spatial and temporal boundaries respectively). These adjoint spatial boundary terms are not included in Equations (3), but need to be included (i.e. in code) in order to correctly compute the unique solutions for the adjoint variables, and the temporal boundary terms are zero and thus drop out.

The spatial derivatives of memory variables $\nabla\kappa\alpha_l\bar{m}_l$ in the adjoint equations (Equations (3)) lead to a significant amount of computational cost. FIG. 5 shows the cost of adjoint computations relative to forward computations for second through twelfth order (spatially) accurate finite-difference (FD) time-domain methods. The relative cost is based on comparing the number of floating-point operations (flops). For three relaxation mechanisms and an eighth-order finite-difference method, the cost of solving the adjoint equations is 2.25 times more expensive than the cost of solving the forward equations (Equations (2)). Also note that as the spatial order of the finite-difference method and the number of relaxation mechanisms increase, the relative cost of solving the adjoint equations increases. Furthermore, it is expected that for large-scale distributed-memory parallel processing computations, the cost of solving the adjoint will increase due to the additional communication of the memory variables.

The linear viscoacoustic equations can be extended to the following linear viscoelastic equations:

$$\frac{\partial \sigma}{\partial t} + C\aleph^T v + \sum_{l=1}^{L}\phi_l m_l = s_\sigma,\qquad(4)$$

$$\frac{\partial v}{\partial t} + \frac{1}{\rho}\aleph\sigma = s_v,$$

$$\frac{\partial m_l}{\partial t} + D_l\aleph^T v + \phi_l m_l = 0,$$

where in the 3D Cartesian coordinate system,
σ=stress, σ=$\{\sigma_{xx}\ \sigma_{yy}\ \sigma_{zz}\ \sigma_{xz}\ \sigma_{yz}\ \sigma_{xy}\}^T$,
$m_l$=memory variable for mechanism l,
$m_l$=$\{m_{l,xx}\ m_{l,yy}\ m_{l,zz}\ m_{l,xz}\ m_{l,yz}\ m_{l,xy}\}^T$, $$C = \begin{bmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{bmatrix},$$

which is the elastic constitutive relationship for the isotropic unrelaxed system in terms of Lamé constants λ and μ, $$D_l = \begin{bmatrix} \lambda\alpha_l^\lambda+2\mu\alpha_l^\mu & \lambda\alpha_l^\lambda & \lambda\alpha_l^\lambda & 0 & 0 & 0 \\ \lambda\alpha_l^\lambda & \lambda\alpha_l^\lambda+2\mu\alpha_l^\mu & \lambda\alpha_l^\lambda & 0 & 0 & 0 \\ \lambda\alpha_l^\lambda & \lambda\alpha_l^\lambda & \lambda\alpha_l^\lambda+2\mu\alpha_l^\mu & 0 & 0 & 0 \\ 0 & 0 & 0 & \mu\alpha_l^\mu & 0 & 0 \\ 0 & 0 & 0 & 0 & \mu\alpha_l^\mu & 0 \\ 0 & 0 & 0 & 0 & 0 & \mu\alpha_l^\mu \end{bmatrix},$$

which is the constitutive relationship for the memory system (for the SLS formulation $$\alpha_l^{\lambda,\mu} = \left(1 - \frac{\tau_{\sigma l}}{\tau_{\epsilon l}^{\lambda,\mu}}\right),$$

and $\tau_{\epsilon l}^{\lambda}$ and $\tau_{\epsilon l}^{\mu}$ are computed from the compressional and shear wave quality factors $Q^P$ and $Q^S$ using Equation (1)), $\aleph^T$=strain operator, $$\aleph^T = \begin{bmatrix} \partial_x & 0 & 0 & \partial_z & 0 & \partial_y \\ 0 & \partial_y & 0 & 0 & \partial_z & \partial_x \\ 0 & 0 & \partial_z & \partial_x & \partial_y & 0 \end{bmatrix}^T.$$

The continuous adjoint of the conventional viscoelastic system (Equations (4)) is $$\frac{\partial \bar{\sigma}}{\partial t} + \aleph^T\left(\frac{1}{\rho}\bar{v}\right) = \frac{\partial \mathcal{F}}{\partial \sigma}, \quad (5)$$

$$\frac{\partial \bar{v}}{\partial t} + \aleph(C\bar{\sigma}) + \sum_{l=1}^{L}\aleph(D_l\bar{m}_l) = \frac{\partial \mathcal{F}}{\partial v},$$

$$\frac{\partial \bar{m}_l}{\partial t} + \phi_l\bar{\sigma} + \phi_l\bar{m}_l = 0,$$

where in the 3D Cartesian coordinate system,
$\bar{\sigma}$=adjoint stress, $\bar{\sigma}=\{\bar{\sigma}_{xx}\ \bar{\sigma}_{yy}\ \bar{\sigma}_{zz}\ \bar{\sigma}_{xz}\ \bar{\sigma}_{yz}\ \bar{\sigma}_{xy}\}^T$,
$\bar{m}_l$=adjoint memory field for mechanism l,
$\bar{m}_l=\{\bar{m}_{l,xx}\ \bar{m}_{l,yy}\ \bar{m}_{l,zz}\ \bar{m}_{l,xz}\ \bar{m}_{l,yz}\ \bar{m}_{l,xy}\}^T$, and $\partial\mathcal{F}/\partial\sigma$ and $\partial\mathcal{F}/\partial v$ are derivatives of the objective function $\mathcal{F}$ with respect to the stress and velocity respectively.

Note that the spatial boundary terms are not included in Equations (4). The temporal boundary terms are zero and thus drop out.

As for the viscoacoustic case, the adjoint equations for the viscoelastic case also contain spatial derivatives of memory variables, which will add a large computational cost to viscoelastic FWI.

Viscoacoustic and Viscoelastic Full Wavefield Inversion

FWI is a partial-differential-equation-constrained optimization method which iteratively minimizes a norm of the misfit between measured and computed wavefields. Seismic FWI involves multiple iterations, and a single iteration can involve the following computations: (1) solution of the forward equations, (2) solution of the adjoint equations, and (3) convolutions of these forward and adjoint solutions to yield a gradient of the cost function. Note that for second-order optimization methods, such as Gauss-Newton, the (4) solution of the perturbed forward equations is also required. A more robust mathematical justification for this case can be found, for example, in U.S. Patent Publication 20130238246, the entire content of which is hereby incorporated by reference.

For viscoacoustic and viscoelastic seismic FWI, the cost of each simulation is exacerbated due to the fact that the relaxation mechanisms needed to accurately model the quality factor's frequency-dependent profile introduce even more variables and equations. Furthermore, the number of simulations that must be computed is proportional to the total number of iterations in the inversion, which is typically on the order of hundreds to thousands. Nevertheless, the benefit of inferring the attenuation properties of the subsurface using this method is expected to outweigh the cost, and development of algorithms and workflows that lead to faster turnaround times is a key step towards making this technology feasible for field-scale data, allowing users to solve larger scale problems faster.

A common iterative inversion method used in geophysics is cost function optimization. Cost function optimization involves iterative minimization or maximization of the value of a cost function $\mathcal{F}(\theta)$ with respect to the model $\theta$. The cost function, also referred to as the objective function, is a measure of the misfit between the simulated and observed data. The simulations (simulated data) are conducted by first discretizing the physics governing propagation of the source signal in a medium with an appropriate numerical method, such as the finite difference or finite element method, and computing the numerical solutions on a computer using the current geophysical properties model.

The following summarizes a local cost function optimization procedure for FWI: (1) select a starting model; (2) compute a search direction $S(\theta)$; and (3) search for an updated model that is a perturbation of the model in the search direction.

The cost function optimization procedure is iterated by using the new updated model as the starting model for finding another search direction, which will then be used to perturb the model in order to better explain the observed data. The process continues until an updated model is found that satisfactorily explains the observed data. Commonly used local cost function optimization methods include gradient search, conjugate gradients, quasi-Newton, Gauss-Newton and Newton's method.

Local cost function optimization of seismic data in the acoustic approximation is a common geophysical inversion task, and is generally illustrative of other types of geophysical inversion. When inverting seismic data in the acoustic approximation, the cost function can be written as:

$$\mathcal{F}(\theta) = \frac{1}{2}\sum_{g=1}^{N_g}\sum_{r=1}^{N_r}\sum_{t=1}^{N_t} W(\psi_{calc}(\theta, r, t, w_g) - \psi_{obs}(r, t, w_g)), \quad (6)$$

where
$\mathcal{F}(\theta)$=cost function,
$\theta$=vector of N parameters, $(\theta_1, \theta_2, \ldots \theta_N)$ describing the subsurface model,
g=gather index,
$w_g$=source function for gather g which is a function of spatial coordinates and time, for
a point source this is a delta function of the spatial coordinates,
$N_g$=number of gathers,
r=receiver index within gather,
$N_r$=number of receivers in a gather,
t=time sample index within a trace,
$N_t$=number of time samples,
W=norm function (minimization function, e.g. for least squares function $(x)=x^2$),
$\psi_{calc}$ calculated seismic data from the model $\theta$,
$\psi_{obs}$ measured seismic data (pressure, stress, velocities and/or acceleration).

The gathers, data from a number of sensors that share a common geometry, can be any type of gather (common midpoint, common source, common offset, common receiver, etc.) that can be simulated in one run of a seismic forward modeling program. Usually the gathers correspond to a seismic shot, although the shots can be more general than point sources. For point sources, the gather index g corresponds to the location of individual point sources. This generalized source data, $\psi_{obs}$, can either be acquired in the field or can be synthesized from data acquired using point sources. The calculated data $\psi_{calc}$ on the other hand can usually be computed directly by using a generalized source function when forward modeling.

FWI attempts to update the discretized model θ such that $\mathcal{F}(\theta)$ is a minimum. This can be accomplished by local cost function optimization which updates the given model $\theta^{(k)}$ as follows:

$$\theta^{(i+1)} = \theta^{(i)} + \gamma^{(i)} S(\theta^{(i)}), \quad (7)$$

where i is the iteration number, γ is the scalar step size of the model update, and S(θ) is the search direction. For steepest descent, $S(\theta) = -\nabla_\theta \mathcal{F}(\theta)$, which is the negative of the gradient of the misfit function taken with respect to the model parameters. In this case, the model perturbations, or the values by which the model is updated, are calculated by multiplication of the gradient of the objective function with a step length γ, which must be repeatedly calculated. For second-order optimization techniques, the gradient is scaled by the Hessian (second-order derivatives of objective function with respect to the model parameters). The computation of $\nabla_\theta \mathcal{F}(\theta)$ requires computation of the derivative of $\mathcal{F}(\theta)$ with respect to each of the N model parameters. N is usually very large in geophysical problems (more than one million), and this computation can be extremely time consuming if it has to be performed for each individual model parameter. Fortunately, the adjoint method can be used to efficiently perform this computation for all model parameters at once (Tarantola, 1984). While computation of the gradients using the adjoint method is efficient relative to other methods, it is still very costly for viscoacoustic and viscoelastic FWI.

Conventional viscoacoustic and viscoelastic full-waveform inversion methods in the time domain compute the gradient of the memory variables to integrate the adjoint equations in time. Earth models taking attenuation into account have been presented both in the frequency and time domains (Ursin and Toverud, 2002). The main focus of frequency-domain methods has been establishing a relationship between attenuation and medium velocities using complex number properties under causality principals, which make them straightforward to directly apply for FWI (Hak and Mulder, 2010).

SUMMARY

A method, including: obtaining an initial geophysical model; modeling a forward wavefield with viscoacoustic or viscoelastic wave equations; modeling an adjoint wavefield with adjoint viscoacoustic or adjoint viscoelastic wave equations, wherein the adjoint viscoacoustic wave equations are based on an auxiliary variable that is a function of pressure and a memory variable or the adjoint viscoelastic wave equations are based on a combination of stress and a memory variable, respectively; obtaining a gradient of a cost function based on a combination of a model of the forward wavefield and a model of the adjoint wavefield; and using the gradient of the cost function to update the initial geophysical model and obtain an updated geophysical model.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1:
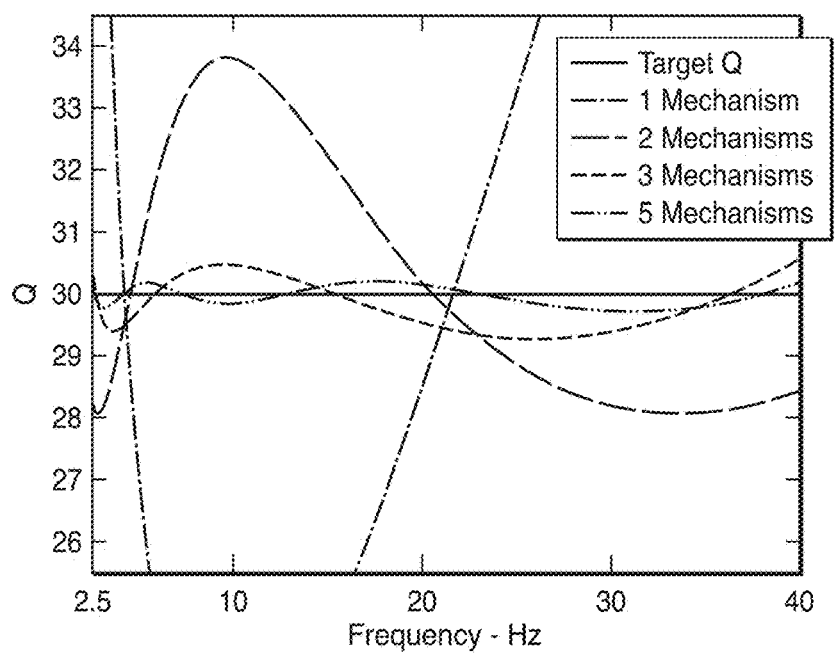
FIG. 1 illustrates exemplary quality-factor models based on 1, 2, 3 and 5 relaxation mechanisms for the Generalized-Maxwell Body model optimized for a frequency-invariant Q=30 (frequency band from 2.5 to 40 Hz).

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

An exemplary embodiment of the present technological advancement is a method for performing full-wavefield inversion (FWI) or reverse-time migration (RTM) requiring viscoacoustic or viscoelastic wave propagation. The method includes attenuation in the time domain using a multi-relaxation rheological model which optimally represents attenuation for a given number of relaxation mechanisms. This attenuation model is flexible for representing the constant or varying frequency dependence of the quality factor over a given seismic frequency bandwidth. The method formulates the viscoacoustic and/or viscoelastic wave equations using new auxiliary state variables which are a combination of pressure and memory variables for the viscoacoustic case or a combination of stress and memory variables for the viscoelastic case. These formulations lead to new wave equation systems with reduced computational complexity.

An exemplary embodiment of the viscoacoustic and viscoelastic FWI framework relies on the GMB rheological model to account for attenuation, which defines the loss factor in the frequency domain $\omega$ as $$Q^{-1}(x, \omega) = \sum_{l=1}^{L} \alpha_l(x) \frac{\phi_l \omega + \phi_l^2 Q^{-1}}{\phi_l^2 + \omega^2}, \quad (8)$$

where
$\phi_l$=Relaxation frequency for mechanism l $\{\phi_1, \phi_2, \ldots, \phi_L\}$,
$\alpha_l$=Relaxation moduli ratio for mechanism ($\alpha=\{\alpha_1, \alpha_2, \ldots, \alpha_L\}$).

The relaxation frequencies are typically chosen to vary exponentially over the frequency band and are spatially invariant (Robertsson et al., 1994). Relaxation moduli are determined by the following approach. An over-determined system of equations is formed by discretizing Equation (8) over the frequency band $\omega=\{\omega_1, \omega_2, \ldots, \omega_n\}$ of the source, where n is the number of frequencies discretized within the band and larger than the number of memory variables L, and is typically 2L+1 for nearly frequency-invariant quality factor and larger for frequency-varying quality factor. The frequencies are typically discretized exponentially over the frequency band for computational effectiveness. This over-determined system of equations is for discretized quality factor $Q=\{Q(\omega_1, x), Q(\omega_2, x), \ldots, Q(\omega_n, x)\}$ at coordinate x:

$$A(\omega, \phi, Q^{-1}(\omega))\alpha = Q^{-1}(\omega), \quad (9)$$

where $$A_{l,i} = \frac{\phi_l \omega_i + \phi_l^2 Q(\omega_i)^{-1}}{\phi_l^2 + \omega_i^2}$$

discretized quality-factor relationship (7) and A has dimensions of L by n.

$\alpha$ can be the inversion parameter. However, if the quality factor Q is constant over the frequency band, it can directly be considered as an inversion parameter instead of $\alpha$. In such cases, the derivative of the objective functional with respect to quality factor Q can be obtained using the chain rule $$\frac{\partial \mathcal{F}}{\partial Q} = \sum_l \frac{\partial \alpha_l}{\partial Q} \frac{\partial \mathcal{F}}{\partial \alpha_l}, \quad (10)$$

where the derivate of relaxation moduli with respect to Q, $\partial \alpha / \partial Q$ is obtained by solving $$A \frac{\partial \alpha}{\partial Q} = -\frac{\partial A}{\partial Q} \alpha - Q^{-2}. \quad (11)$$

Figure 2:
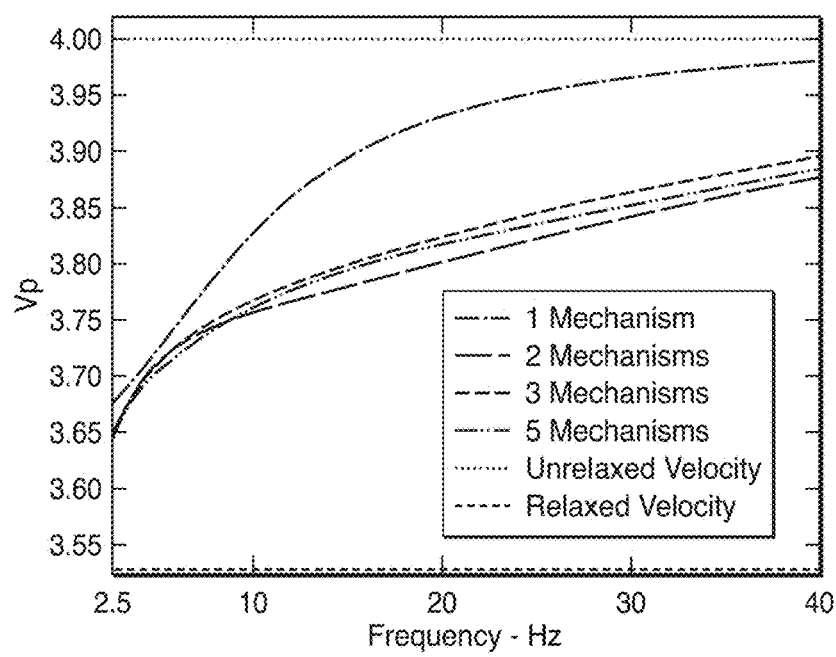
FIG. 2 illustrates exemplary velocity dispersion curves computed with 1, 2, 3 and 5 relaxation mechanisms for the Generalized-Maxwell Body model of FIG. 1.
Figure 3:
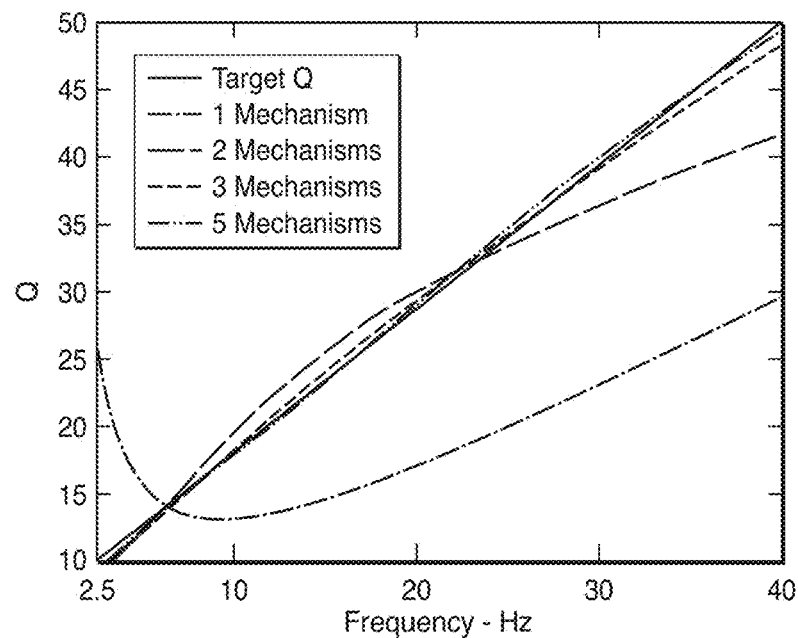
FIG. 3 illustrates exemplary quality-factor models based on 1, 2, 3 and 5 relaxation mechanisms for the Generalized-Maxwell Body model optimized for a linearly-varying quality factor over the band from 2.5 to 40 Hz.
Figure 4:
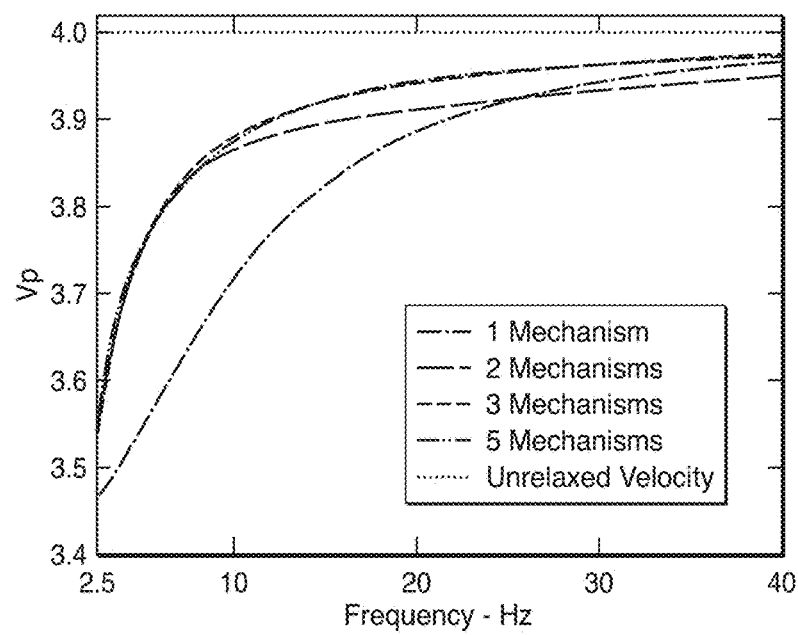
FIG. 4 illustrates exemplary velocity dispersion curves computed with 1, 2, 3 and 5 relaxation mechanisms for the Generalized-Maxwell Body model of FIG. 3.
Figure 5:
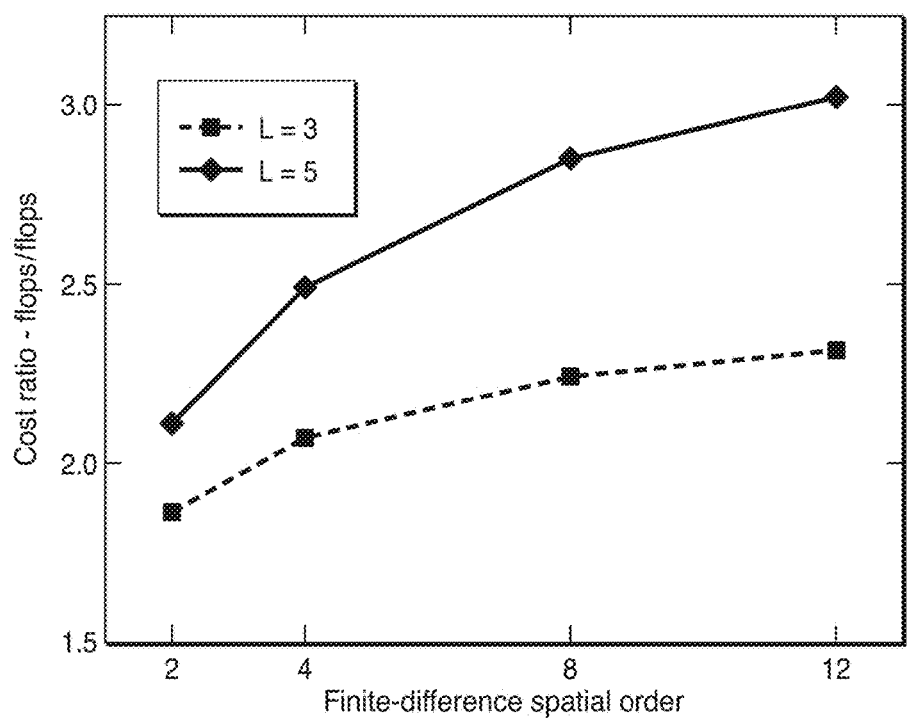
FIG. 5 illustrates a non-limiting example of the cost (in terms of floating-point operations flops) of adjoint relative to the forward for conventional 3D viscoacoustic for L=3 and L=5 relaxation mechanisms.

FIGS. 1 and 2 illustrate examples of the quality-factor and velocity dispersion curves obtained by 1, 2, 3 and 5 relaxation mechanisms of GMB models which are designed to represent a frequency-invariant quality factor of 30 (target Q) over a frequency band from 2.5 to 40 Hz. The parameters of these attenuation models are computed using Equation (9). These figures show that the accuracy of the modeled attenuation and dispersion increases with the number of relaxation mechanisms. FIGS. 3 and 4 illustrate an example of the quality-factor and dispersion responses of these models for a linearly-varying quality factor (over the frequency band), and once again show that the accuracy of the modeled attenuation and dispersion increases with the number of relaxation mechanisms.

We derive the viscoacoustic and viscoelastic adjoint equations in continuous form (often referred to as a continuous adjoint method) in order to demonstrate the improved efficiency of the present technological advancement. However, one may first discretize the forward equations and then derive the adjoints of the discretized equations (Betts et al., 2005), which is referred to as a discrete adjoint method. The present technological advancement described in this application is applicable for both types of derivations of the FWI equations.

One embodiment of the present technological advancement provides an improved viscoacoustic FWI method which is based on a new form of viscoacoustic equations. A new auxiliary variable is defined as $$\zeta_l = p - \frac{1}{\alpha_l} m_l, \quad (12)$$

and Equation (12) is used to carry out a linear transformation of Equations (2). The resulting viscoacoustic wave equations are $$\frac{\partial p}{\partial t} + \kappa \nabla \cdot v + r = 0, \quad (13)$$

$$\frac{\partial v}{\partial t} + \frac{1}{\rho} \nabla p = s_v,$$

$$\frac{\partial \zeta_l}{\partial t} - \phi_l(p - \zeta_l) + r = 0,$$

$$r = \sum_{l=1}^{L} \alpha_l \phi_l (p - \zeta_l) - s_p,$$

where r is a new variable which is defined for clarity. The relaxation moduli ratios used in the memory equations are obtained from Equation (9).

The adjoint of Equations (13) is $$\frac{\partial \bar{p}}{\partial t} + \nabla \cdot \left(\frac{1}{\rho}\bar{v}\right) + \sum_{l=1}^{L} \phi_l(-\bar{\zeta}_l + \bar{r}_l) = \frac{\partial \mathcal{F}}{\partial p},$$

$$\frac{\partial \bar{v}}{\partial t} + \nabla(\kappa \bar{p}) = \frac{\partial \mathcal{F}}{\partial v},$$

$$\frac{\partial \bar{\zeta}_l}{\partial t} + \phi_l \bar{\zeta}_l - \phi_l \bar{r}_l = 0,$$

$$\bar{r}_l = \alpha_l \left(\bar{p} + \sum_{k=1}^{L} \bar{\zeta}_k\right).$$ (14)

Note that the spatial boundary terms are not included in Equations (14). The temporal boundary terms are zero and thus drop out.

The auxiliary variable introduced (Equation (12)), which is a combination of pressure and memory variables, replaces the memory variable in order to lower the cost of solving the adjoint wavefield equations compared to alternative equations that do not employ the auxiliary variable.

Figure 8:
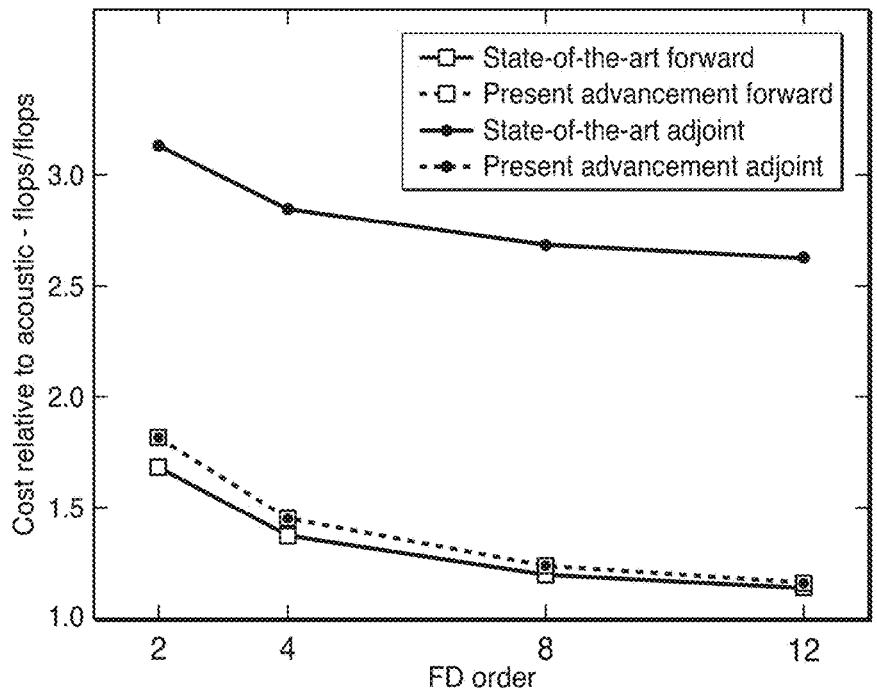
FIG. 8 is a non-limiting example of the cost of solving 3-D viscoacoustic forward and adjoint equations according to the present technological advancement relative to cost of solving conventional acoustic forward equations with a three relaxation mechanism attenuation model.
Figure 9:
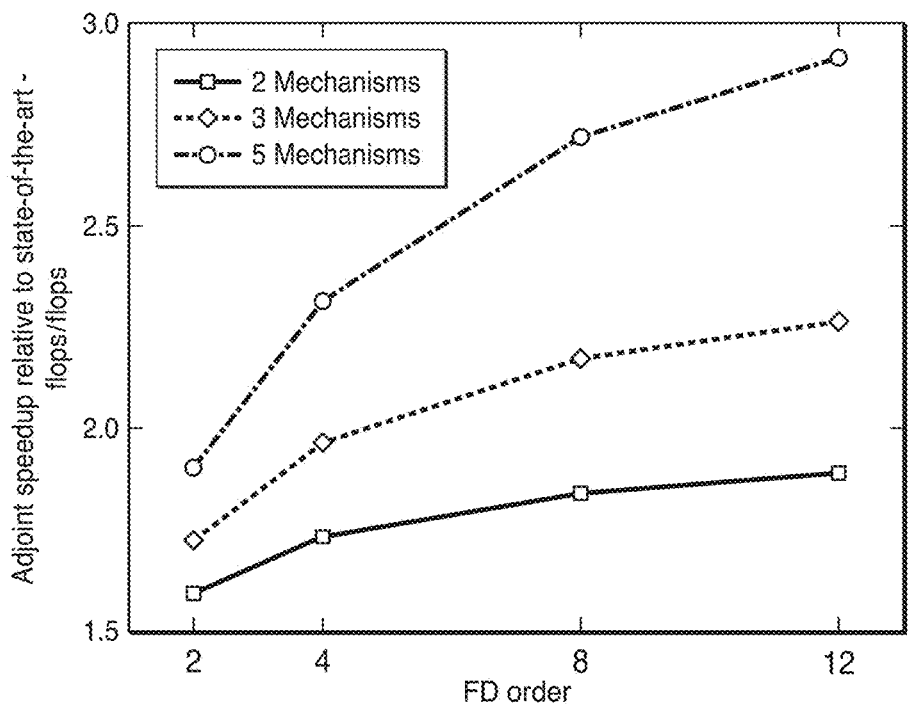
FIG. 9 is a non-limiting example of the speedup for 3-D viscoacoustic adjoint according to the present technological advancement relative to conventional adjoint for L=2, L=3 and L=5 relaxation mechanism attenuation models.

In contrast to the conventional viscoacoustic adjoint (Equations (3)), spatial derivatives of the memory variables are not present in the adjoint Equations (14), which reduces the computational cost for solving the adjoint. In the exemplary method embodying the present technological advancement, the cost of solving the adjoint (Equations (14)) is approximately the same as the cost of solving the forward equations (Equations (13)). FIG. 8 illustrates the cost (based on comparing the number of flops) in solving the conventional and new forward and adjoint viscoacoustic equations relative to the forward acoustic equations. In FIG. 8, solid lines depict the cost of solving conventional equations and dashed lines depict the cost of solving equations embodying the present technological advancement. Even though the cost of the new forward solver actually increases by a small margin (versus the conventional forward solver), the cost of the new adjoint solver significantly decreases versus the state-of-the-art adjoint solver, and the overall cost therefore decreases. For example, for an eighth-order FD time-domain method and rheological model using three relaxation mechanisms, the relative adjoint cost is 2.68 for the state-of-the-art method and reduces to 1.24 for the new method. Furthermore, the adjoint speed-up of the present advancement relative to the state-of-the art is shown in FIG. 9 for 2, 3 and 5 relaxation mechanisms.

The continuous gradients of the objective function with respect to the inversion parameters are $$\frac{\partial \mathcal{F}}{\partial \kappa} = \int_0^T \bar{p} \nabla \cdot v \, dt,$$

$$\frac{\partial \mathcal{F}}{\partial \rho} = -\int_0^T \bar{v} \cdot \frac{1}{\rho^2} \nabla p \, dt,$$

$$\frac{\partial \mathcal{F}}{\partial \alpha_l} = \int_0^T \bar{r} \phi_l (p - \zeta_l) \, dt \text{ or}$$

$$\frac{\partial \mathcal{F}}{\partial Q} = \int_0^T \bar{r} \sum_{l=1}^{L} \frac{\partial \alpha_l}{\partial Q} \phi_l (p - \zeta_l) \, dt$$ (15)

if $Q$ is the inversion parameter,

Thus, $$\nabla_\theta \mathcal{F}(\theta) = \left\{\frac{\partial \mathcal{F}}{\partial \kappa} \; \frac{\partial \mathcal{F}}{\partial \rho} \; \frac{\partial \mathcal{F}}{\partial \alpha_l}\right\}^T \text{ or } \left\{\frac{\partial \mathcal{F}}{\partial \kappa} \; \frac{\partial \mathcal{F}}{\partial \rho} \; \frac{\partial \mathcal{F}}{\partial Q}\right\}^T.$$

The perturbed forward equations required for a second-order optimization method are $$\frac{\partial \hat{p}}{\partial t} + \kappa \nabla \cdot \hat{v} + r = -\delta \kappa \nabla \cdot v,$$

$$\frac{\partial \hat{v}}{\partial t} + \frac{1}{\rho} \nabla \hat{p} = \frac{\delta \rho}{\rho^2} \nabla p,$$

$$\frac{\partial \hat{\zeta}_l}{\partial t} - \phi_l (\hat{p} - \hat{\zeta}_l) + r = 0,$$

$$r - \sum_{l=1}^{L} \alpha_l \phi_l (\hat{p} - \hat{\zeta}_l) =$$

$$\begin{cases} \sum_{l=1}^{L} \delta \alpha_l \phi_l (p - \zeta_l) & \text{if } \alpha_l \text{ is the inversion parameter} \\ \delta Q \sum_{l=1}^{L} \frac{\partial \alpha_l}{\partial Q} \phi_l (p - \zeta_l) & \text{if } Q \text{ is the parameter} \end{cases},$$ (16)

where
$\hat{p}$=perturbed pressure,
$\hat{v}$=perturbed velocity,
$\hat{m}_l$=perturbed memory variable for mechanism l.

The same approach can be extended to the viscoelastic wave equations. The computational savings will be larger for a given number of relaxation mechanisms because the total number of memory variables for the 3D viscoelastic equations will be six times larger than that for the viscoacoustic case. We define new auxiliary variables $$\zeta_l = \sigma - C D_l^{-1} m_l,$$ (17)

and carry out a linear transformation of Equations (4) with the new auxiliary variables. This transformation eliminates spatial derivatives of the memory variables in the adjoint, and reduces the computational cost for solving the adjoint system. The resulting viscoelastic wave equations are $$\frac{\partial \sigma}{\partial t} + C \aleph^T v + r = 0,$$

$$\frac{\partial v}{\partial t} + \frac{1}{\rho} \aleph \sigma = s_v,$$

$$\frac{\partial \zeta_l}{\partial t} - \phi_l (\sigma - \zeta_l) + r = 0,$$

$$r = \sum_{l=1}^{L} \phi_l D_l C^{-1} (\sigma - \zeta_l) - s_\sigma,$$ (18)

where r is a new variable which is defined for clarity. The relaxation moduli ratios used in the memory equations are obtained from Equation (9).

The adjoint of Equations (18) is $$\frac{\partial \bar{\sigma}}{\partial t} + \aleph^T \left(\frac{1}{\rho}\bar{v}\right) + \sum_{l=1}^{L} \phi_l(-\bar{\zeta}_l + \bar{r}_l) = \frac{\partial \mathcal{F}}{\partial \sigma},$$ (19)

-continued $$\frac{\partial \bar{v}}{\partial t} + \aleph(C\bar{\sigma}) = \frac{\partial \bar{\mathcal{F}}}{\partial v},$$

$$\frac{\partial \bar{\zeta}_l}{\partial t} + \phi_l \bar{\zeta}_l - \phi_l \bar{r}_l = 0,$$

$$\bar{r}_l = D_l C^{-1} \left( \bar{\sigma} + \sum_{k=1}^{L} \bar{\zeta}_k \right),$$

where
$\bar{\zeta}_l$=adjoint memory field for mechanism l,
$\bar{\zeta}_l = \{\bar{\zeta}_{l,xx} \, \bar{\zeta}_{l,yy} \, \bar{\zeta}_{l,zz} \, \bar{\zeta}_{l,xz} \, \bar{\zeta}_{l,yz} \, \bar{\zeta}_{l,xy}\}^T$,
$\bar{r}_l$=variable defined for clarity for mechanism l,
$\bar{r}_l = \{\bar{r}_{l,xx} \, \bar{r}_{l,yy} \, \bar{r}_{l,zz} \, \bar{r}_{l,xz} \, \bar{r}_{l,yx} \, \bar{r}_{l,xy}\}^T$.

Note that the spatial boundary terms are not included in Equations (19). The temporal boundary terms are zero and thus drop out.

It is straightforward to derive alternative computationally efficient second-order time derivative formulations of the acoustic or elastic wave equations as opposed to first-order time derivative formulations as shown in this application. For the acoustic case, one may derive the second-order form of the acoustic equations by taking a time-derivative of both the first (pressure) and third (memory) equations in (13) and eliminating the ∂v/∂t term using the second (velocity) equation. For the elastic case, one may derive the second-order form of the elastic equations by taking a time-derivative of both the first (stress) and third (memory) equations in (18) and eliminating the ∂v/∂t term using the second (velocity) equation. Spatial derivatives of the memory variables will not be present in the adjoint equations of such second-order systems as demonstrated for first-order systems (equations 14 and 19).

Example

Figure 6:
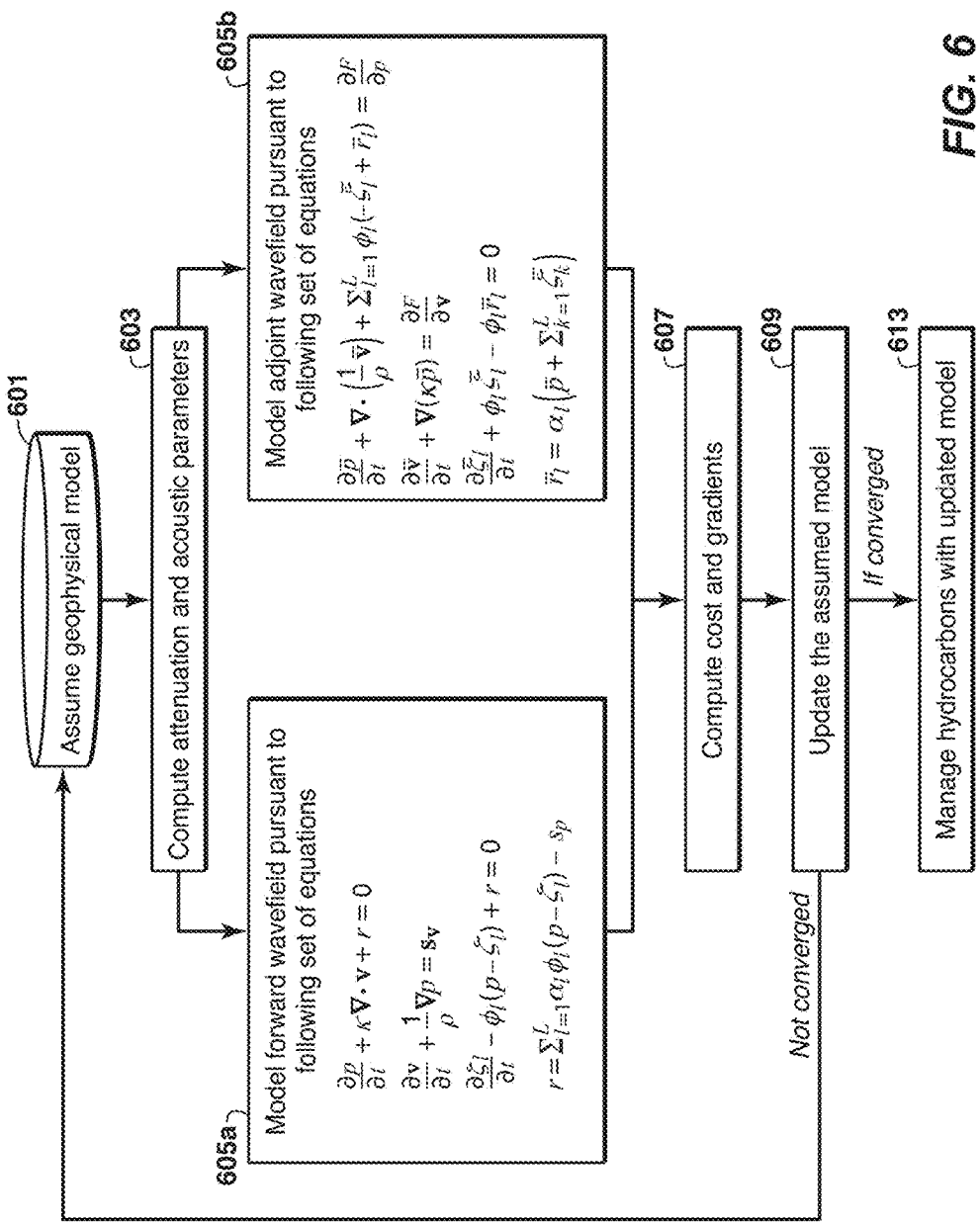
FIG. 6 illustrates an exemplary method for viscoacoustic full-wavefield inversion.
Figure 10:
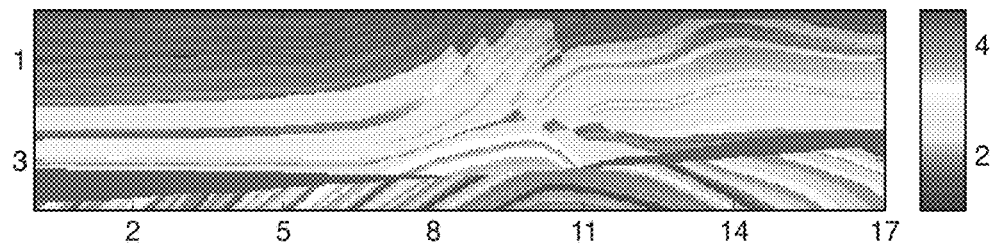
FIG. 10 is an example of a Marmousi velocity model (scale unit is in km/s).
Figure 11:
FIG. 11 is an example of a true quality-factor model (scale unit is for inverse of quality factor).

FIG. 6 illustrates an exemplary method for a viscoacoustic FWI method using Equations (13) to (16). In step 601, a geophysical model is assumed. A geophysical model gives one or more subsurface properties as a function of location in a region. For this example, a Marmousi velocity model (FIG. 10) and a quality-factor model that has several low-Q anomalies, layers of intermediate Q values, and a smooth background (FIG. 11) are used. The velocity and quality-factor models are structurally uncorrelated.

In step 603, attenuation parameters a are computed using Equations (9). The GMB model can be used for an assumed Q frequency dependence.

In steps 605a and 605b, the forward wavefield model Equations (13) and the adjoint model Equations (14) are solved. Step 605b can utilize measured data in the modeling of the adjoint wavefield.

In step 607, the gradient of the cost function is obtained from a convolution of Equations (13) and (14) in order to arrive at the gradients of the objective function with respect to the inversion parameters (14). Step 607 can utilize measured data in obtaining the gradient of the cost function.

Figure 14:
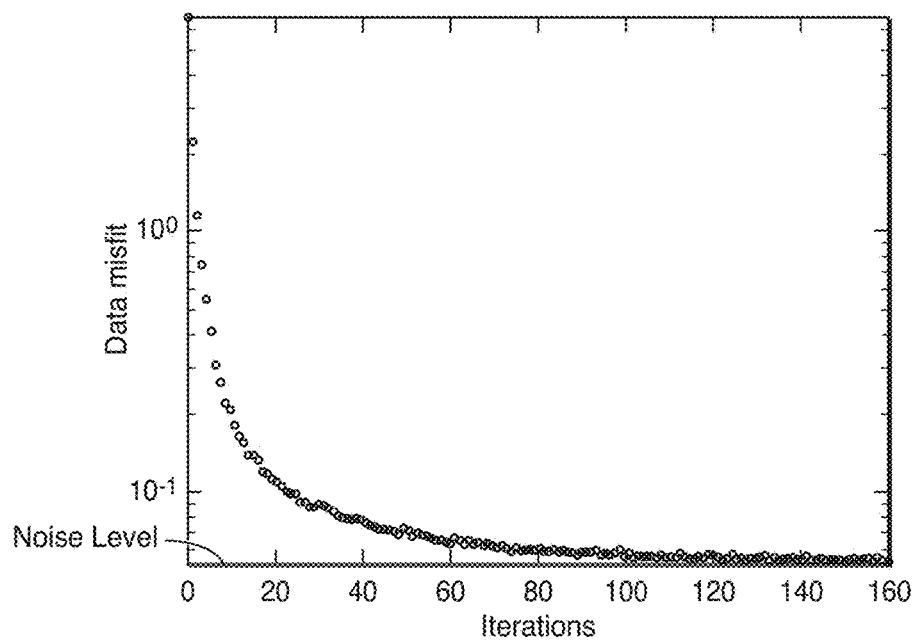
FIG. 14 is an example of a change of objective function (least-square norm of data misfit) with number of iterations.

In step 609, the gradient of the cost function (which provides the rate of the change of the cost function in a given direction) is then used to update the geophysical model in order to minimize the cost function. Step 609 can include searching for an updated geophysical property model that is a perturbation of the initial geophysical property model in the gradient direction that better explains the observed data. The iterative process of FIG. 6 can be repeated until predetermined convergence between measured data and the updated model is obtained. FIG. 14 shows how the data misfit of the objective function (least-square norm of data misfit) decreases with number of iterations.

Figure 12:
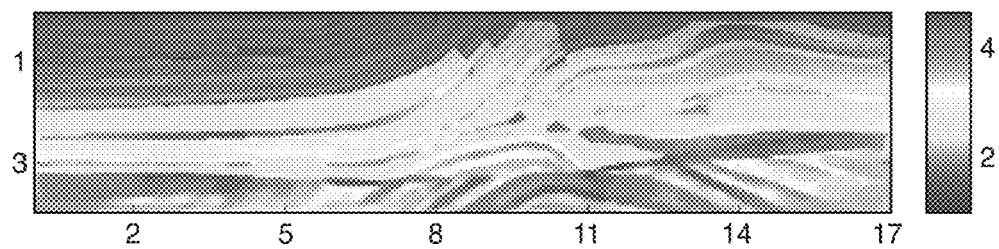
FIG. 12 is an example of an inverted velocity model (scale unit is in km/s).
Figure 13:
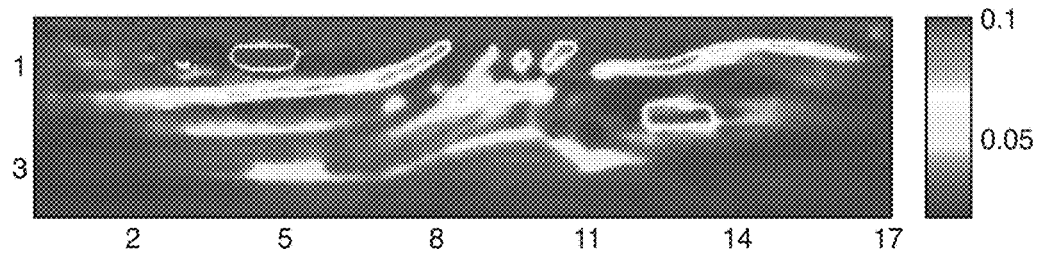
FIG. 13 is an example of an inverted quality-factor model (scale unit is for inverse of quality factor).

Assuming a 16 km maximum offset and 10 seconds of recorded (synthetic) data, 40 sources, 100 receivers, and a 10 Hz Ricker wavelet source, the inverted or updated results for velocity and Q models are shown in FIGS. 12 and 13 respectively, demonstrating that the present technological advancement is able to invert for both parameters (velocity and Q) at a greatly reduced computational cost.

When the updated assumed model converges, the process proceeds to step 613. In step 613, an updated subsurface model is used to manage hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 7:
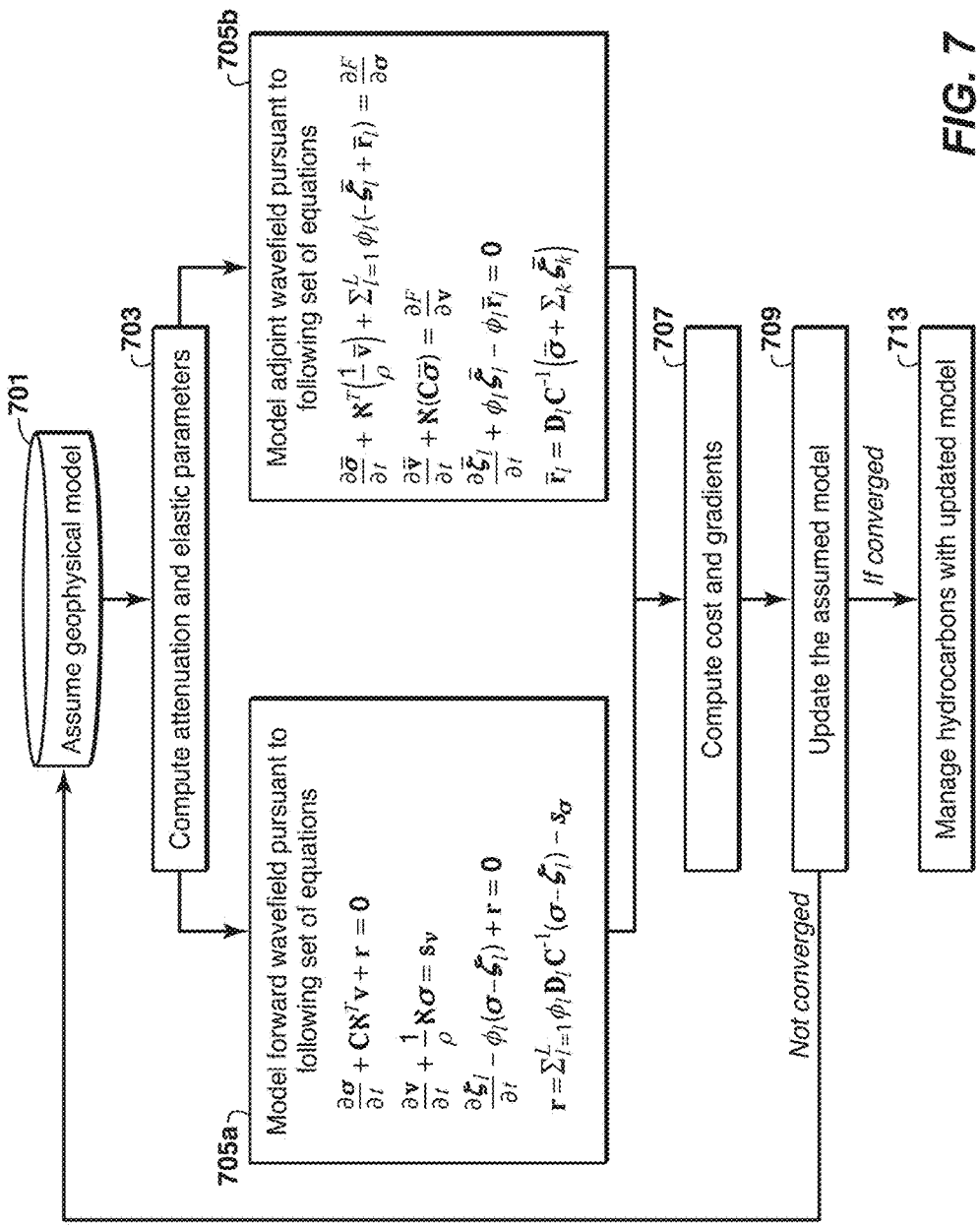
FIG. 7 illustrates an exemplary method for viscoelastic full-wavefield inversion.

FIG. 7 illustrates an exemplary method for a viscoelastic FWI method using Equations (18) to (19). The method of FIG. 7 (steps 701-713) is analogous to that of FIG. 6 (steps 601-613), except that the equations have changed.

Figure 15:
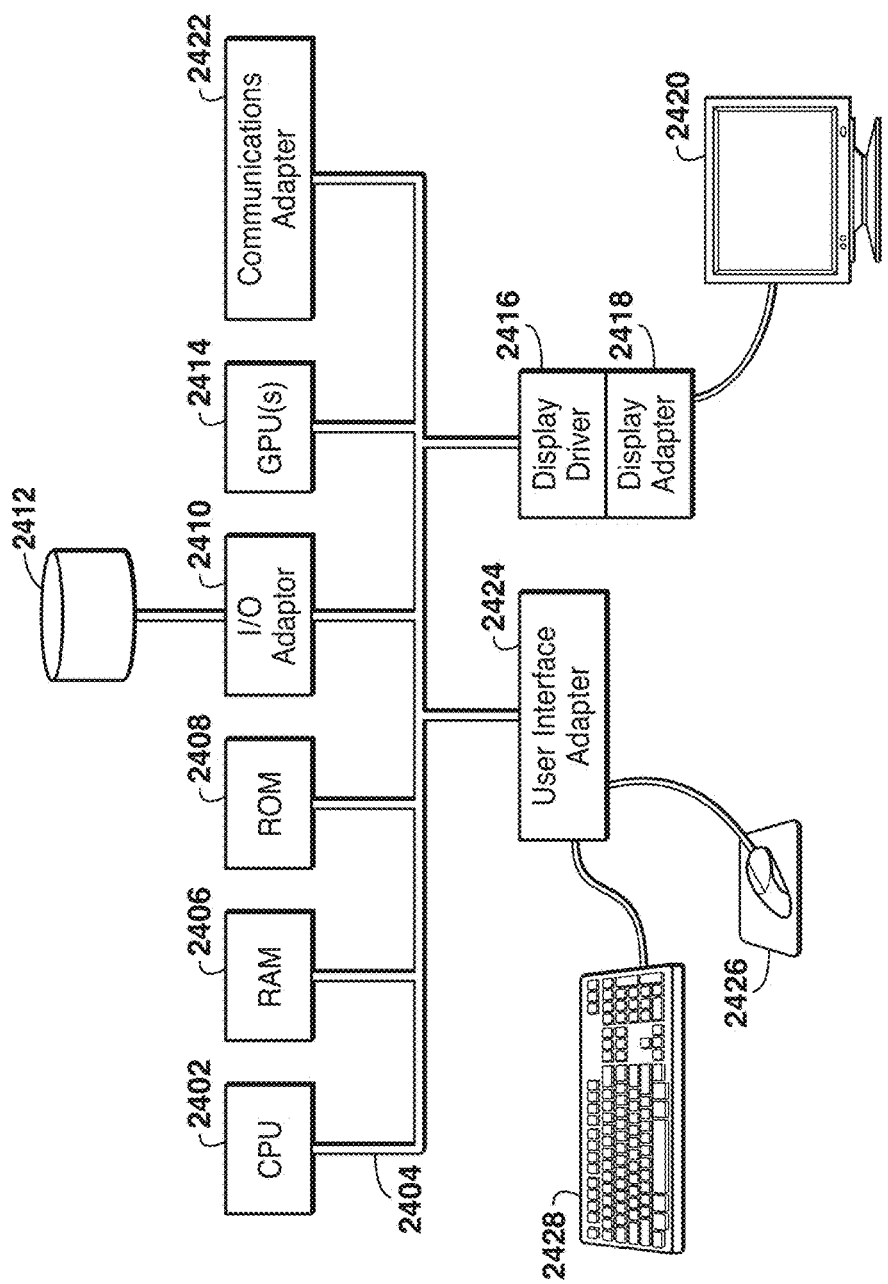
FIG. 15 is an example of a computer that can execute methods that embody the present technological advancement.

FIG. 15 is a block diagram of a computer system 2400 that can be used to execute the present geophysical inversion techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 15, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. indeed, the present techniques include all alternatives, modifications, and equivalents falling within the spirit and scope of the appended claims.

REFERENCES

The following documents are each incorporated by reference in their entirety:
1. Tarantola, A., "Inversion of seismic reflection data in the acoustic approximation," *Geophysics* 49, 1259-1266 (1984).
2. Hak, B., and Mulder W. A. "Seismic attenuation imaging with causality," *Geophysical Journal International* 184, 439-451 (2011).
3. Day, S. M. and Minster J. B., "Numerical simulation of attenuated wavefields using a Padé approximant method," Geophysical Journal of International, 78, 105-118 (1984).
4. Ursin, B. and Toverud, T., "Comparison of seismic dispersion and attenuation models," Studia Geophysica et Geodaetica, 46, 293-320 (2002).
5. Carcione, J. M., Kosloff D. and Kosloff R., "Viscoacoustic wave propagation simulation in the Earth," Geophysics, 53, 769-777 (1988).
6. Carcione J. M. "Wave fields in real media: Wave propagation in anisotropic anelastic, porous and electromagnetic media" Handbook of Geophysical Exploration: Seismic Exploration, 38, Elsevier, $2^{nd}$ Edition (2007)
7. Muller, T. M., Gurevich, B. and Lebedev, M., "Seismic wave attenuation and dispersion resulting from wave induced flow in porous rocks—A review," Geophysics, 75, 147-164 (2010).
8. Bai, J., Yingst D., Bloor R. and Leveille J. "Waveform inversion with attenuation," Society of Exploration Geophysicists Extended Technical Abstract, 2012
9. Royle, G. T., "Viscoelastic orthorhombic full wavefield inversion: development of multiparameter inversion methods," Society of Geophysicist Extended Abstact, 2011.
10. Robertsson, J. A. O., Blanch J. O. and Symes W. W., "Viscoelastic finite-difference modeling," Geophysics, 59, 1444-1456 (1994).
11. Hestholm, S., Ketcham, S., Greenfield, R., Moran, M. and McMechan G., "Quick and accurate Q parameterization in viscoelastic wave modeling," Geophysics, 71, 147-150 (2006).
12. Charara, M., Barnes, C. and Tarantola, A., "Full waveform inversion of seismic data for a viscoelastic medium" Methods and Applications of Inversion: Lecture Notes in Earth Sciences, 92, 68-81 (2000).
13. Käser, M., Dumbser, M., Puente, J. and Igel, H. "An arbitrary high-order Discontinuous Galerkin method for elastic waves on unstructured meshes III. Viscoelastic attenuation," Geophysics Journal International, 168, 224-242 (2007).
14. JafarGandomi, A. and Takenaka, H., "Efficient FDTD algorithm for plane wave simulation for vertically heterogeneous attenuative media," Geophysics, 72, 43-53 (2007).
15. Quintal, B., "Frequency-dependent attenuation as a potential indicator of oil saturation," Journal of Applied Geophysics, 82, 119-128, 2012.
16. Betts, J. T. and Campbell, S. L., "Discretize then optimize," Mathematics in Industry: Challenges and Frontiers A Process View: Practice and Theory, Ferguson, D. R. and Peters, T. J., eds., SIAM Publications (2005).
17. Thevenin D. and Janiga G., "Optimization and computational fluid dynamics," Springer-Verlag, (2008).

What is claimed is:
1. A method of managing hydrocarbons, comprising:
   obtaining, with a computer, an initial geophysical model;
   modeling, with the computer, a forward wavefield with viscoacoustic or viscoelastic wave equations, wherein the forward wavefield with viscoacoustic wave equations is based on a first auxiliary variable that is a function of both pressure and a memory variable or the forward wavefield with viscoelastic wave equations is based on a second auxiliary variable that is a function of both stress and a memory variable, respectively, and the first or second auxiliary variable is chosen to eliminate a velocity term from the forward wavefield with viscoacoustic or viscoelastic wave equations;
   modeling, with the computer, an adjoint wavefield with adjoint viscoacoustic or adjoint viscoelastic wave equations, which are derived from the forward viscoacoustic or the forward viscoelastic wave equations, respectively, and are based on an adjoint of the first or second auxiliary variable, respectively,
   wherein the modeling includes causing a spatial derivative of the memory variable to not be present in the adjoint viscoacoustic or viscoelastic wave equations by a change of variables comprising replacing the memory variable with the first or second auxiliary variable in the viscoacoustic or viscoelastic wave equations, respectively, thereby causing the adjoint viscoacoustic or viscoelastic wave equations to include spatially-pointwise operations of the first or second auxiliary variable, respectively, instead of the spatial derivative operations of the memory variable;
   obtaining, with the computer, a gradient of a cost function based on a combination of a model of the forward wavefield and a model of the adjoint wavefield;
   updating, with the computer, the initial geophysical model with the gradient of the cost function, and obtaining and displaying an updated geophysical model; and managing hydrocarbons using the updated geophysical model.

2. The method of claim 1, wherein obtaining the initial geophysical model includes obtaining relaxation parameters for a given quality factor using an initial rheological model and acoustic or elastic medium parameters.

3. The method of claim 1, wherein the adjoint wavefield is modeled using the adjoint viscoacoustic equations.

4. The method of claim 3, wherein the first auxiliary variable is $$\zeta_l = p - \frac{1}{\alpha_l} m_l,$$

where p is pressure, $m_l$ is the memory variable for mechanism l, where l is an integer greater than or equal to 1, and $\alpha_l$ is inversion parameter for mechanism l.

5. The method of claim 4, wherein the adjoint viscoacoustic equations are $$\frac{\partial \overline{p}}{\partial t} + \nabla \cdot \left(\frac{1}{\rho} \overline{v}\right) + \sum_{l=1}^{L} \phi_l(-\overline{\zeta}_l + \overline{r}_l) = \frac{\partial \mathcal{F}}{\partial p},$$

$$\frac{\partial \overline{v}}{\partial t} + \nabla(\kappa \overline{p}) = \frac{\partial \mathcal{F}}{\partial v},$$

$$\frac{\partial \overline{\zeta}_l}{\partial t} + \phi_l \overline{\zeta}_l - \phi_l \overline{r}_l = 0,$$

$$\overline{r}_l = \alpha_l \left(\overline{p} + \sum_{k=1}^{L} \overline{\zeta}_k\right),$$

where
 $\nabla$ is a divergence operator,
 t is time,
 $\kappa$ is an unrelaxed bulk modulus ($\lim_{\omega \to \infty} \kappa(\omega) \to \kappa$),
 $\rho$ is a mass density,
 v is a velocity (v={$v_x, v_y, v_z$}$^T$ in 3D space),
 $\overline{p}$ is an adjoint pressure,
 $\mathcal{F}(\theta)$ is the cost function, where $\theta$ is the model parameters (i.e. some combination of Q or $\alpha_l$, $\kappa$ and $\rho$),
 $\overline{v}$ is an adjoint velocity, and
 $\phi_l$ is a relaxation frequency for mechanism l,
 $\partial \mathcal{F}/\partial p$ and $\partial \mathcal{F}/\partial v$ are derivatives of the objective function $\mathcal{F}$ with respect to pressure and velocity respectively.

6. The method of claim 1, wherein the adjoint wavefield is modeled using the adjoint viscoelastic equations.

7. The method of claim 6, wherein the second auxiliary variable is $\zeta_l = \sigma - CD_l^{-1} m_l$, where $\sigma$ is stress, $m_l$ is a memory variable for mechanism l, where l is an integer greater than or equal to 1, C is an elastic constitutive relationship for an isotropic unrelaxed system and $D_l$ is a constitutive relationship for a memory system.

8. The method of claim 7, wherein the adjoint viscoelastic equations are $$\frac{\partial \overline{\sigma}}{\partial t} + \aleph^T\left(\frac{1}{\rho} \overline{v}\right) + \sum_{l=1}^{L} \phi_l(-\overline{\zeta}_l + \overline{r}_l) = \frac{\partial \mathcal{F}}{\partial \sigma},$$

$$\frac{\partial \overline{v}}{\partial t} + \aleph(C\overline{\sigma}) = \frac{\partial \mathcal{F}}{\partial v},$$

$$\frac{\partial \overline{\zeta}_l}{\partial t} + \phi_l \overline{\zeta}_l - \phi_l \overline{r}_l = 0,$$

$$\overline{r}_l = D_l C^{-1}\left(\overline{\sigma} + \sum_k \overline{\zeta}_k\right),$$

where
 t is time,
 $\overline{\sigma}$=adjoint stress, $\overline{\sigma}$={$\overline{\sigma}_{xx}\ \overline{\sigma}_{yy}\ \overline{\sigma}_{zz}\ \overline{\sigma}_{xz}\ \overline{\sigma}_{yz}\ \overline{\sigma}_{xy}$}$^T$,
 $\overline{v}$ is an adjoint velocity,
 $\overline{\zeta}_l$ is an adjoint memory field for mechanism l, $\overline{\zeta}_l$={$\overline{\zeta}_{l,xx}\ \overline{\zeta}_{l,yy}\ \overline{\zeta}_{l,zz}\ \overline{\zeta}_{l,xz}\ \overline{\zeta}_{l,yz}\ \overline{\zeta}_{l,xy}$}$^T$,
 $\overline{r}_l$=variable defined for clarity for mechanism l, $\overline{r}_l$={$\overline{r}_{l,xx}\ \overline{r}_{l,yy}\ \overline{r}_{l,zz}\ \overline{r}_{l,xz}\ \overline{r}_{l,yx}\ \overline{r}_{l,xy}$}$^T$,
 $\rho$ is a mass density,
 $\partial \mathcal{F}/\partial \sigma$ and $\partial \mathcal{F}/\partial v$, are derivatives of the objective function $\mathcal{F}$ with respect to the stress and velocity respectively $$C = \begin{bmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{bmatrix},$$

which is the elastic constitutive relationship for the isotropic unrelaxed system in terms of Lamé constants $\lambda$ and $\mu$, $$D_l = \begin{bmatrix} \lambda\alpha_l^\lambda+2\mu\alpha_l^\mu & \lambda\alpha_l^\lambda & \lambda\alpha_l^\lambda & 0 & 0 & 0 \\ \lambda\alpha_l^\lambda & \lambda\alpha_l^\lambda+2\mu\alpha_l^\mu & \lambda\alpha_l^\lambda & 0 & 0 & 0 \\ \lambda\alpha_l^\lambda & \lambda\alpha_l^\lambda & \lambda\alpha_l^\lambda+2\mu\alpha_l^\mu & 0 & 0 & 0 \\ 0 & 0 & 0 & \mu\alpha_l^\mu & 0 & 0 \\ 0 & 0 & 0 & 0 & \mu\alpha_l^\mu & 0 \\ 0 & 0 & 0 & 0 & 0 & \mu\alpha_l^\mu \end{bmatrix},$$

which is the constitutive relationship for the memory system ($\alpha_l^{\lambda,\mu}$ are computed from the compressional and shear wave quality factor using Equation (9)), and $\aleph^T$=strain operator, $$\aleph^T = \begin{bmatrix} \partial_x & 0 & 0 & \partial_z & 0 & \partial_y \\ 0 & \partial_y & 0 & 0 & \partial_z & \partial_x \\ 0 & 0 & \partial_z & \partial_x & \partial_y & 0 \end{bmatrix}^T$$

$\mathcal{F}(\theta)$ is the cost function, where $\theta$ is the model parameters (i.e. some combination of $Q^P$, $Q^S$ or $\alpha_l^{\lambda,\mu}$, $\lambda$, $\mu$ and $\rho$).

9. The method of claim 1, wherein the initial geophysical model includes a velocity model.

10. The method of claim 1, wherein the initial geophysical model includes a quality factor model.

11. The method of claim 1, wherein the first or second auxiliary variable is based on a plurality of relaxation mechanisms.

12. The method of claim 1, wherein the obtaining the initial geophysical model includes obtaining relaxation parameters for a given quality factor using a Generalized-Maxwell rheological model and acoustic or elastic medium parameters.

13. The method of claim 1, further comprising causing a well to be drilled at a location derived from the updated geophysical model.

14. The method of claim 1, wherein the updated geophysical model resulting from the updating identifies location of structure in earth's subsurface that returned seismic wave to receivers that recorded.

* * * * *